(12) United States Patent
Perkuhn et al.

(10) Patent No.: US 9,667,471 B2
(45) Date of Patent: May 30, 2017

(54) PRE-SCHEDULING OF QUALITY OF SERVICE RESERVATION

(75) Inventors: Heiko Perkuhn, Bonn (DE); Markus Kampmann, Andernach (DE); Marc Vorwerk, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 586 days.

(21) Appl. No.: 13/641,141

(22) PCT Filed: Apr. 19, 2010

(86) PCT No.: PCT/EP2010/002402
§ 371 (c)(1),
(2), (4) Date: Nov. 15, 2012

(87) PCT Pub. No.: WO2011/131211
PCT Pub. Date: Oct. 27, 2011

(65) Prior Publication Data
US 2013/0138807 A1 May 30, 2013

(51) Int. Cl.
*G06F 15/16* (2006.01)
*G06F 15/173* (2006.01)
*H04L 12/16* (2006.01)
*H04L 12/24* (2006.01)
*H04W 28/26* (2009.01)
*H04L 29/08* (2006.01)
*H04L 29/06* (2006.01)

(52) U.S. Cl.
CPC ............ *H04L 41/00* (2013.01); *H04L 67/325* (2013.01); *H04W 28/26* (2013.01); *H04L 65/4076* (2013.01)

(58) Field of Classification Search
CPC ... H04L 29/06; H04L 47/10; H04L 29/08072; H04L 29/08576; H04L 41/0213; H04L 29/06027; H04L 29/08117; H04L 29/0809; H04L 29/06537; H04L 41/22; H04L 41/12; H04L 29/06421; H04M 3/567; H04M 3/56; H04M 7/006
USPC .................................................. 709/232, 228
See application file for complete search history.

(56) References Cited

U.S. PATENT DOCUMENTS

| 5,745,694 | A | * | 4/1998 | Egawa | ...................... H04Q 3/62 709/225 |
| 5,933,417 | A | * | 8/1999 | Rottoo | ................ H04L 12/1877 348/E7.084 |
| 6,278,712 | B1 | * | 8/2001 | Takihiro | .............. H04L 12/5695 370/356 |

(Continued)

FOREIGN PATENT DOCUMENTS

| CN | 1198646 A | 11/1998 |
| EP | 2026613 A1 | 2/2009 |

*Primary Examiner* — Mahran Abu Roumi
(74) *Attorney, Agent, or Firm* — Coats & Bennett, P.L.L.C.

(57) ABSTRACT

The present disclosure relates to a technique for scheduling resource reservations of services in a service providing network. A method embodiment comprises the steps of receiving a resource reservation request indicating a preferred time period for delivery of a requested service available in the network; and scheduling resource reservation of the requested service based on statistical information related to resource utilizations or reservations of one or more services available in the network and the preferred time period for delivery of the requested service.

24 Claims, 5 Drawing Sheets

(56) References Cited

U.S. PATENT DOCUMENTS

| | | | |
|---|---|---|---|
| 6,631,121 B1 | 10/2003 | Yoon | |
| 6,886,042 B1 * | 4/2005 | Watahiki | H04N 5/782 348/E7.061 |
| 8,542,603 B2 * | 9/2013 | Kisel | H04L 12/5695 370/252 |
| 8,750,279 B2 * | 6/2014 | Riley | H04L 29/06027 370/235 |
| 2004/0205206 A1 * | 10/2004 | Naik | H04L 29/06 709/230 |
| 2005/0025180 A1 * | 2/2005 | Curcio | H04L 12/5695 370/468 |
| 2005/0240668 A1 * | 10/2005 | Rolia | H04L 67/325 709/223 |
| 2006/0288251 A1 * | 12/2006 | Jackson | G06F 11/1471 714/19 |
| 2010/0218230 A1 * | 8/2010 | Oh | H04N 21/2343 725/116 |
| 2011/0191482 A1 * | 8/2011 | Przybysz | H04L 12/14 709/228 |
| 2011/0273984 A1 * | 11/2011 | Hsu | H04L 12/5695 370/235 |

\* cited by examiner

PRE-SCHEDULING OF QUALITY OF SERVICE RESERVATION

TECHNICAL FIELD

The invention generally relates to the field of service scheduling. More specifically, the invention relates to a technique for scheduling resource reservations of services in a service providing network.

BACKGROUND

Multimedia services become increasingly important not only in wireline environments, but also in wireless environments. The multimedia services in both wireline and wireless environments should offer customers a high quality experience.

One important feature to provide such kind of experience is Quality of Service (QoS) provision and reservation. QoS provision and reservation ensures that the services provided and requested in a service providing network can be transmitted with the respective resources they require. In this context, QoS refers to resource reservation control mechanisms. For example, by reservation of a required QoS, a required bit rate, delay, jitter, packet dropping probability and/or bit error rate may be guaranteed for a respective service.

In the IP Multimedia Subsystem (IMS), the node controlling resource reservations is the Policy and Charging Rules Function (PCRF). Within IMS the PCRF is the policy entity that forms the linkage between the service and transport layers. The PCRF collates subscriber and application data, authorizes QoS resources, and instructs the transport plane on how to proceed with the underlying data traffic. The PCRF is connected on its northbound Rx interface to the Application Function (AF), an element residing on the service plane, which represents applications that require dynamic policy and QoS control over the traffic plane behavior. Within an IMS network, a Proxy-Call Session Control Function (P-CSCF) would commonly fulfill the role of an AF. The P-CSCF is a Session Initiation Protocol (SIP) proxy that is the first point of contact for an IMS terminal.

The PCRF receives information about offer/answer exchanges between terminals from the AF over the Rx interface. If the characteristics of the session being established are acceptable to the PCRF (based on the domain policy), the PCRF authorizes the session on the access gateway using a Gx interface. If the characteristics of the session are not acceptable to the PCRF, it instructs the AF to terminate the session using the Rx interface. Of course, in this case the PCRF does not authorize the session on the access gateway.

When the PCRF informs the AF that the session being established is not acceptable, the AF must inform the terminal trying to establish the session. This information from the AF to the terminal would normally not carry an indication of the type of session or the time of session set up that would be acceptable to the network. Therefore, it would be difficult for the terminal to generate a new acceptable offer. Additionally, the user experience would be far from ideal. The session would be established and terminated immediately. Thus, a terminal is not always informed why its session was rejected. The user of the terminal may not understand what to do to establish a new session that will be accepted. A user may also receive a successful-session establishment indication and a session-terminated indication, one immediately after the other.

In short, by means of the P-CSCF and the PCRF, for any kind of session (voice, video, audio, conversational, non-conversational), a resource reservation is made via the Rx interface. Depending on the kind of service, a certain QoS class is requested and if resources are free, this class is granted. This kind of resource reservation, however, always takes place at session set up, which may lead to decreased usability.

Compared to just in time services, scheduled services like podcasting are gaining more importance. In these scheduled services, however, time constraints for media delivery exist. These time constraints normally vary dependent on the type of the scheduled service. As an example, podcast services should usually be delivered to a user requesting the podcast in a time range of one or more hours, like one to twelve hours, e.g. 6 hours. Streaming services, however, may require a shorter time range, like a range of up to several minutes. Thus, the above procedure is not well suited for scheduled services that operate according to strict conditions relating to scheduling.

In current deployments, there is no mechanism for prioritization of services. Resource reservation always takes place upon session set up, regardless of the kind of service. There are cases, though, where it is known beforehand that certain resources are going to be needed at a certain time. In the case of e.g. podcast-like media delivery, all subscribers to the service will get the media items at the same time, usually when updated content becomes available. This kind of peak phenomenon can easily lead to network congestion, if no measures are taken.

SUMMARY

Accordingly, there is a need to provide an improved, more user-friendly and more efficient service provision technique.

According to a first aspect, a method for scheduling resource reservations of services in a service providing network is provided. The method comprises the steps of receiving a resource reservation request indicating a preferred time period for delivery of a requested service available in the network; and scheduling resource reservation of the requested service based on statistical information related to resource utilizations or reservations of one or more services available in the network and the preferred time period for delivery of the requested service.

The one or more services available in the network may comprise one or more Point-to-Multipoint (PTM) services provided in the network, like one or more broadcast services, one or more multicast services or one or more combined broadcast/multicast services, e.g. Multimedia Broadcast Multicast Service (MBMS) user services. Likewise, the requested service available in the network may be a PTM service, like a broadcast service, a multicast service or a combined broadcast/multicast service, e.g. an MBMS user service.

The term preferred "time period" is not limited to a certain period of time, but may also indicate an infinitesimal small time period up to a certain point of time. In this respect, the term preferred time period may also be understood as a preferred point of time. The preferred time period may be a period of time of any range suitable in the field of service scheduling in a service providing network, e.g. several seconds, minutes, hours or one or more days.

In the context of the statistical information related to resource utilizations or reservations of one or more services available in the network, the term "one or more services" implies that at least one of (prior and/or typical) resource reservations of the requested service and (prior and/or typical) resource reservations of one or more other services provided in the network (different to the requested service) may be considered. In this respect, the one or more services, for example, comprise at least the requested service. Alternatively or additionally to the requested service, the one or more services may comprise one or more other services which are provided in the service providing network.

The statistical information may comprise at least one of information indicating when the requested service is typically delivered (requested) and information indicating when one or more other services are typically delivered (requested). Alternatively or additionally thereto, the statistical information may comprise at least one of information indicating when the requested service has been previously delivered (requested) and information indicating when one or more other services have been previously delivered (requested). It is conceivable that the statistical information may comprise information indicating when a plurality of different services including the requested service is usually requested or delivered and that the statistical information may comprise information indicating when the plurality of different services including the requested service has been previously requested or delivered.

In this way, it may be derived from the statistical information when the requested service is typically delivered (requested) and when one or more other services are typically delivered (requested). Alternatively or additionally, it may be derived from the statistical information when the requested service has been previously delivered (requested) and when one or more other services have been previously delivered (requested).

For scheduling the resource reservation of the requested service it may be sufficient that the statistical information related to only one service, e.g. the requested service or a service different from the requested service, is considered. For example, it may be derivable from the statistical information that the requested service is usually requested or delivered (or has previously been requested or delivered) at a certain point of time or in a certain period of time. In this case, this point of time or period of time may be determined as a potential point of time or period of time for delivery of the requested service. The potential point of time or period of time may be compared with the preferred time indicated by the requested service, and if they match with each other (e.g. overlap with each other), the matching part(s) may be chosen for delivery.

Alternatively or additionally, it may be derivable from the statistical information that one or more other services (not the requested service) are usually (or have been previously) requested or delivered at a certain point of time or in a certain period of time. In this case, for scheduling the resource reservation of the requested service, a different point of time or period of time (than that determined for the one or more other services) may be determined as a potential point of time or period of time for delivery of the requested service. If the potential point of time or period of time matches the preferred time period, the requested service may be scheduled accordingly.

Independent of whether only the statistical information related to the requested service or to a different service or both the statistical information related to the requested service and related to one or more further services are taken into account, the scheduling of resource reservation of the requested service is not only based on the statistical information, but is further based on the preferred time period for delivery of the requested service. By signaling the resource reservation request, it is indicated in which time period the delivery of the requested service is preferred or desired. The preferred time period may then be compared with a time period in which the service is typically delivered, which may be derived from the statistical information. If the requested time period and the typical time period match or overlap, delivery of the requested service may be scheduled in the overlapping period. If the requested time period and the typical time period do not overlap, the delivery of the requested service may be scheduled in a period lying between the requested time period and the typical time period.

In the resource reservation request it may be indicated that a user wants the service to be delivered at a preferred point of time. After considering the statistical information, it may be determined that the load of the network is typically high at the preferred point of time of delivery, i.e. much bandwidth is already requested or reserved for other services in the network. The information as to when how much bandwidth is typically requested by which service may be derivable from the statistical information. In this case, a different point of time than the preferred point of time may be determined as the point of time for delivery of the requested service. For example, the different point of time of delivery is determined as a point of time at which less traffic can safely be expected. In this respect, the scheduling of resource reservation of the requested service may be regarded as a compromise between the preferred time for delivery of the requested service and the time where load of the network is expectably low. The latter may be derivable from the statistical information.

According to a first variant, the method may further comprise rejecting the resource reservation request when no or insufficient resources are available for the preferred time period. It is conceivable that a resource reservation request is received for a scheduled service, which indicates a preferred time period for delivery of the scheduled service. If there is already a reservation (or if there is typically a reservation) for a large service delivery, e.g. a large download or streaming or podcast delivery scheduled (and reserved), in the preferred time period, the resource reservation request may simply be rejected. The already scheduled reservation does not necessarily have to completely overlap with the whole preferred time period, but may partially overlap with the preferred time period in order to reject the scheduled service. For example, a lengthy video download may be rejected when there is a reservation for a large podcast (or other service) delivery scheduled (and reserved) some time later, like from one minute to two hours later, e.g. thirty minutes later.

According to a second variant, the resource reservation request may not be simply rejected when there are no or insufficient resources available for the time period preferred by the requested service, but the delivery of the requested service may be divided into two or more parts over the preferred time period. In other words, the step of scheduling may further comprise dividing delivery of the requested service into two or more parts over the preferred time period when no or insufficient resources are available in at least one or more sub-periods of the preferred time period. For example, the requested service may be a lengthy download service, like a download service requiring a download time between ten and sixty minutes, and the preferred time period indicated by the resource reservation request may be one hour or even more, like between one hour and twelve hours, e.g. six hours. By way of the preferred time period, it is indicated in which time frame the requested service shall be preferably delivered. In case there exists a time range over the preferred time period where no or insufficient resources are available for delivery of the requested service, a first part of the requested download service may be scheduled in a first sub-period of the preferred time period (before the time range in which there are no or insufficient resources) and a second part of the requested download service may be resumed when there are again sufficient resources available in the preferred time period, i.e. in a second sub-period after the time range in which there are no or insufficient resources available. If there is more than one range in which there are no or insufficient resources available, the download service may be sub-divided into more than two, e.g. in a plurality of sub-periods, during which the requested download service may be delivered.

The statistical information may have been stored based on predetermined statistical information related to typical resource utilizations or reservations of one or more services available in the network. Alternatively or additionally, the method may further comprise a step of monitoring information related to resource utilizations or reservations of the one or more services available in the network. Based on the monitored information related to previous resource utilizations or reservations of the one or more services available in the network, the predetermined statistical information may be updated. According to a first realization, predetermined statistical information related to typical resource utilizations or reservations of the one or more services may be stored. The predetermined statistical information may then be updated based on the monitored information related to previous resource utilizations or reservations of the one or more services. In accordance with a second realization, no statistical information has been predetermined and the whole statistical information may be based on the monitored information related to previous resource utilizations or reservations of the one or more services.

The predetermined statistical information may be periodically updated with the monitored information after predetermined time intervals. Alternatively, the predetermined statistical information may be updated with the monitored information whenever new information about previous user reservations or utilizations become available.

The statistical information may comprise at least one of information about typical times (or previous times) the one or more services available in the network are requested and information about an average frequency (or a previous frequency) the one or more services available in the network are requested. By comparing the typical times the requested service and one or more other services are usually requested with the preferred time period for delivery of the requested service, resource reservation of the requested service may be scheduled e.g. such that a compromise is made between the typical times and the preferred time period.

A user may request delivery of a scheduled service like a podcast service for a preferred time period. The preferred time period may then be compared with information (derived from the statistical information) about typical times and an average frequency one or more other services than the requested scheduled service are typically requested or delivered. If in the preferred time period enough resources are available, i.e. the one or more other services typically do not require all or most of the resources available in the network, the resource reservation is scheduled in the preferred time period. If the typical times and the average frequency the one or more other services are requested or delivered do not allow the delivery of the requested scheduled service during the preferred time period, the requested scheduled service may either be rejected or sub-divided as set forth above.

If the preferred time period at least partially complies with the typical times and the average frequency the requested scheduled service is typically delivered or requested, the preferred time period or a compromise between the preferred time period one the one hand and the typical times and the typical frequency on the other hand may be determined as the time for delivery of the requested scheduled service.

In this way, a kind of prioritization may be implemented for some services. For example, services like podcast or other multimedia delivery services may get a high priority during night times (resources are preferably reserved during night times) as it is unlikely that other services like a stock market ticker are heavily requested then. During the day this prioritization may be reverted, since it can be assumed that e.g. stock market tickers are much more sought-after than e.g. podcast services during day time. In this way, typical times and average frequencies of the one or more services available in the network may be considered for scheduling resource reservation of the requested service.

Alternatively, a user may require immediate delivery of a "just in time service" like a streaming service for which a respective resource reservation request would be transmitted indicating an immediate delivery of the requested service. In this case, it may be derived from the information about typical times and the average frequency the one or more other services available in the network are requested or delivered whether the typical times and the average frequency allow immediate delivery of the requested service. The requested service may then be delivered immediately or may be scheduled for later delivery or nor delivery depending on the typical times and the average frequency derived from the statistical information.

The method may further comprise, prior to the step of scheduling, determining one or more possible start times for delivery of the requested service based on the statistical information. In this case, the step of scheduling may further comprise starting the delivery of the requested service at one of the one or more possible start times dependent on the preferred time period. It is conceivable that the resource reservation request indicates a preferred time period and that one or more possible start times for delivery of the requested service are determined based on the statistical information, wherein only one or a view of the possible start times lie within the preferred time period. In such a case, the delivery of the requested service would preferably be started at the possible start time lying within the preferred time period or the best of possible start times lying within the preferred time period, e.g. the start time which is closest to the start time of the preferred time period.

After the step of scheduling as set forth above, a step of performing resource reservation for the requested service based on the scheduled resource reservation may be determined. In this way, the scheduled resource reservations are actually reserved.

The requested service may comprise the transmission of a podcast, an automotive warning, a news broadcast, audio data, video data, or a message of a short message service (SMS) or a multimedia message service (MMS).

Further to the scheduling technique set forth above, the method may further comprise a technique of dynamically forming multicast/broadcast groups, if e.g. MBMS bearers are available. The possible forming of MBMS groups may take place long before the actual session set up (in the order of hours or even days). Depending on the service, either unicast or multicast/broadcast resources may be reserved. For example, the type of the requested service(s) may be analyzed and the number of subscribers requesting the same content may be taken into account.

In this way, groups of subscribers that receive the same content may be created. For example, the number of subscribers requesting the same content may be compared with a predetermined number, and dependent on whether the number of subscribers is equal to or greater than the predetermined number or is less than the predetermined number, multicast resources (when the number of subscribers is equal to or greater than the predetermined number) or unicast resources (when the number of subscribers is less than the predetermined number) may be reserved. By forming the groups, it may be decided based on the number of subscribers when each group of users should get its content and over which connection, e.g. MBMS when the group is big enough or unicast if not.

In this way, the method may further comprise the step of receiving a multicast resource reservation request indicating a preferred time period for multicast delivery of the requested MBMS service (when the group is big enough) or receiving a unicast resource reservation request indicating a preferred time period for unicast delivery of the requested MBMS service (when the group is not big enough). The decision of whether multicast or unicast delivery is chosen may be dependent on the number of subscribers receiving the same content of the MBMS service.

According to a further aspect, a computer program product is proposed, comprising program code portions for performing steps of any one of the method aspects described herein, when the computer program product is run on one or more computing devices. The computer program product may be stored on a computer readable recording medium.

According to still a further aspect, a device for scheduling resource reservations of services in a service providing network is proposed. The device comprises a receiving component for receiving a resource reservation request indicating a preferred time period for delivery of a requested service available in the network; and a scheduling component for scheduling resource reservation of the requested service based on statistical information related to resource utilizations or reservations of one or more services available in the network and the preferred time period for delivery of the requested service.

The scheduling component may be further adapted to reject the resource reservation request when no or insufficient resources are available for the preferred time period. The method aspects related to scheduling described herein may be performed by the scheduling component.

Further, the device may comprise a storage component for storing the statistical information related to resource utilizations or reservations of the one or more services available in the network.

According to a first variant, the device may further comprise a monitoring component for monitoring information related to resource utilizations or reservations of the one or more services available in the network. According to this first variant, the device may further comprise an updating component for updating the statistical information stored in the storage component based on the monitored information related to resource utilizations or reservations of the one or more services available in the network.

According to a second variant, which may/may not be combined with the first variant, the device may further comprise a reservation component for performing resource reservation for the requested service based on the scheduled resource reservation.

BRIEF DESCRIPTION OF THE DRAWINGS

In the following, the invention will further be described with reference to exemplary embodiments illustrated in the figures, in which.

DETAILED DESCRIPTION

In the following description, for purposes of explanation and not limitation, specific details are set forth, such as specific network topologies including particular network nodes, communication protocols etc., in order to provide a thorough understanding of the current invention. It will be apparent to one skilled in the art that the current invention may be practiced in other embodiments that depart from these specific details. For example, the skilled artisan will appreciate that the current invention may be practiced with PTM services, multicast/broadcast mechanisms or other PTM communication features different from the 3GPP MBMS standard discussed below to illustrate the current invention. Also, the invention may be practiced in any network to which mobile or stationary users may attach. For example, the invention is applicable to, besides cellular networks, WLAN, Bluetooth, DVB or similar wireless networks, but also to wireline networks such as, for example, the intranet of a company with some or many separated subsidiaries or the Internet.

Those skilled in the art will further appreciate that functions explained hereinbelow may be implemented using individual hardware circuitry, using software functioning in conjunction with a programmed microprocessor or a general purpose computer, using an application specific integrated circuit (ASIC) and/or using one or more digital signal processors (DSPs). It will also be appreciated that when the current invention is described as a method, it may also be embodied in a computer processor and a memory coupled to a processor, wherein the memory is encoded with one or more programs that perform the methods disclosed herein when executed by the processor.

While the exemplary embodiments described below are based on an IMS network comprising a Policy and Charging Rules Function (PCRF) functionality, the skilled person will understand that other network architectures without the classical IMS nodes and environment might also be used, i.e. every network architecture providing the PCRF (also named Resource and Admission Control Subsystem (RACS)) functionality.

Figure 1:
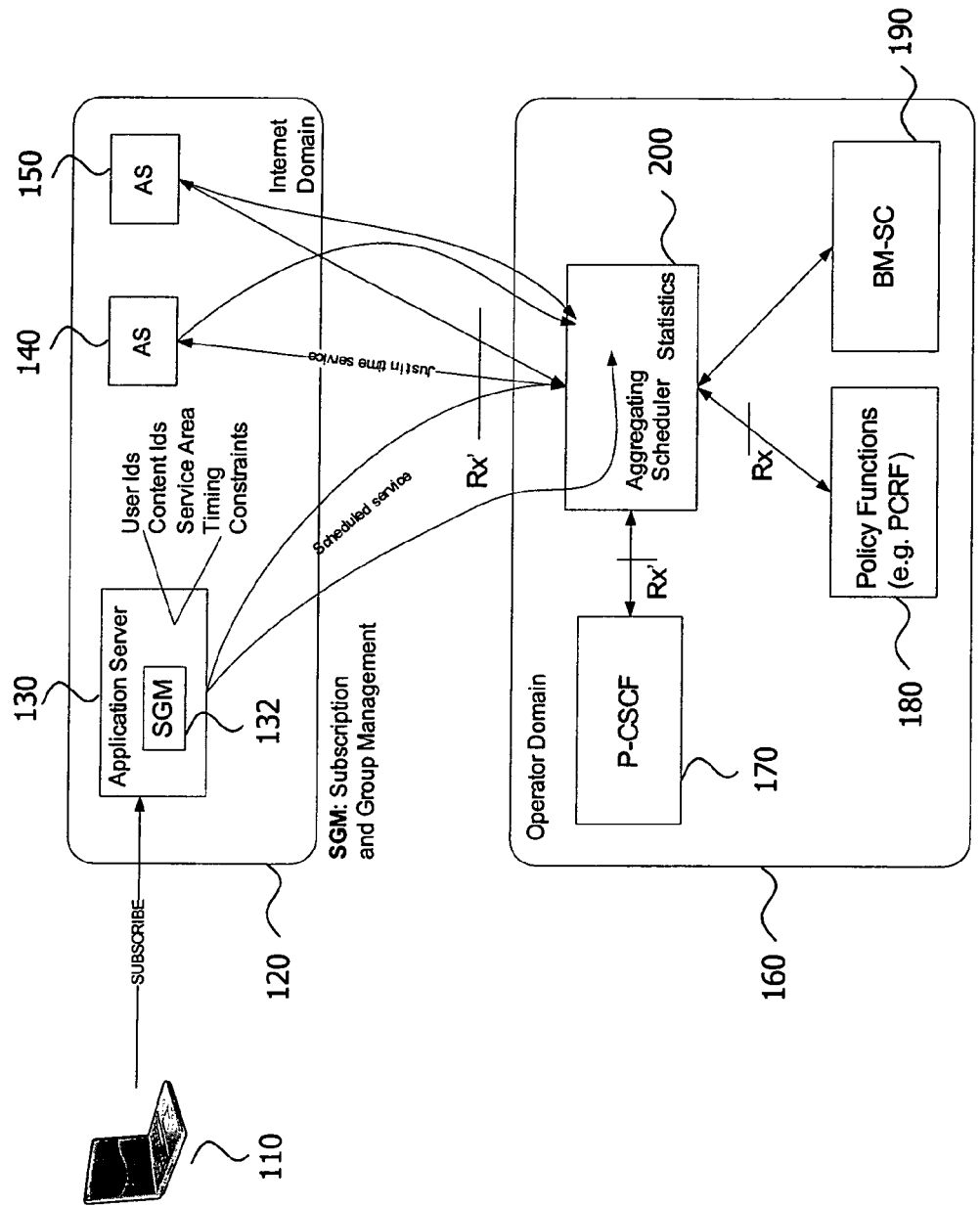
FIG. 1 is a schematic illustration of a part of an IMS network architecture.

With reference to FIG. 1, an Internet Domain (service/application layer) 120 and an Operator Domain (IMS layer) 160 of a part of an IP Multimedia Subsystem (IMS) network architecture 100 are schematically illustrated. On the Internet Domain 120 side there are provided a plurality of Application Servers (AS), as exemplarily illustrated in FIG.

1 three ASs 130, 140, 150, which provide Multimedia Broadcast Multicast Service (MBMS) user services of different kind, like video services, audio services, podcast services or other kind of multimedia services. A user interested in a respective service can subscribe to one or more of the ASs 130, 140, 150 providing the respective MBMS user services. As exemplarily illustrated in FIG. 1, a user subscribes to AS 130 via a terminal device 110. The terminal device 110 is exemplarily illustrated in FIG. 1 as a notebook, but may be any other terminal device capable of accessing (mobile) communication networks, like a mobile terminal device, e.g. a User Equipment (UE). The AS 130 comprises a Subscription and Group Management (SGM) 132, the function of which being described in more detail below. The AS 130 has knowledge of information indicating the identity of the users subscribed to respective services provided by the AS 130 (User Identity), the content the users require for delivery (Content Identity), the area to be served by the AS 130 with the respective services (Service Area) and Timing Constraints for the respective services provided by the AS 130.

The Operator Domain 160 side comprises a Proxy-Call Session Control Function (P-CSCF) 170, a Policy and Charging Rules Function (PCRF) 180, and a Broadcast/Multicast Service Center (BM-SC) 190. Further, the Operator Domain 160 side includes an Aggregating Scheduler 200 containing statistical information related to resource utilizations or reservations of one or more MBMS user services available in the network 100. The Aggregating Scheduler 200 is connected on its Rx interface to the PCRF 180 and exemplarily also interfaces the BM-SC 190. However, the Aggregating Scheduler does not necessarily have to also interface the BM-SC 190. Further, the Aggregating Scheduler 200 is connected to both the P-CSCF 170 and the Internet Domain 120 side via an Rx' interface.

In order to not interfere with "normal" session set up procedures initiated by the P-CSCF 170, the Rx' interface is provided (between the Aggregating Scheduler 200 and the ASs 130, 140, 150 and between the Aggregating Scheduler 200 and the P-CSCF 170) that offers the same functionality as the normally used Rx interface. The difference from the Rx' interface to the typically used Rx interface (in commonly known networks without the Aggregating Scheduler, the Rx interface connects the P-CSCF and the PCRF) is that it is offered by the Aggregating Scheduler 200, which connects to the policy functions of the PCFR 180 via the actual Rx interface. The benefit of this solution is that reservations requested by the P-CSCF 170 can be blocked by the Aggregating Scheduler 200 due to pre-scheduled reservations with a higher priority.

Figure 2:
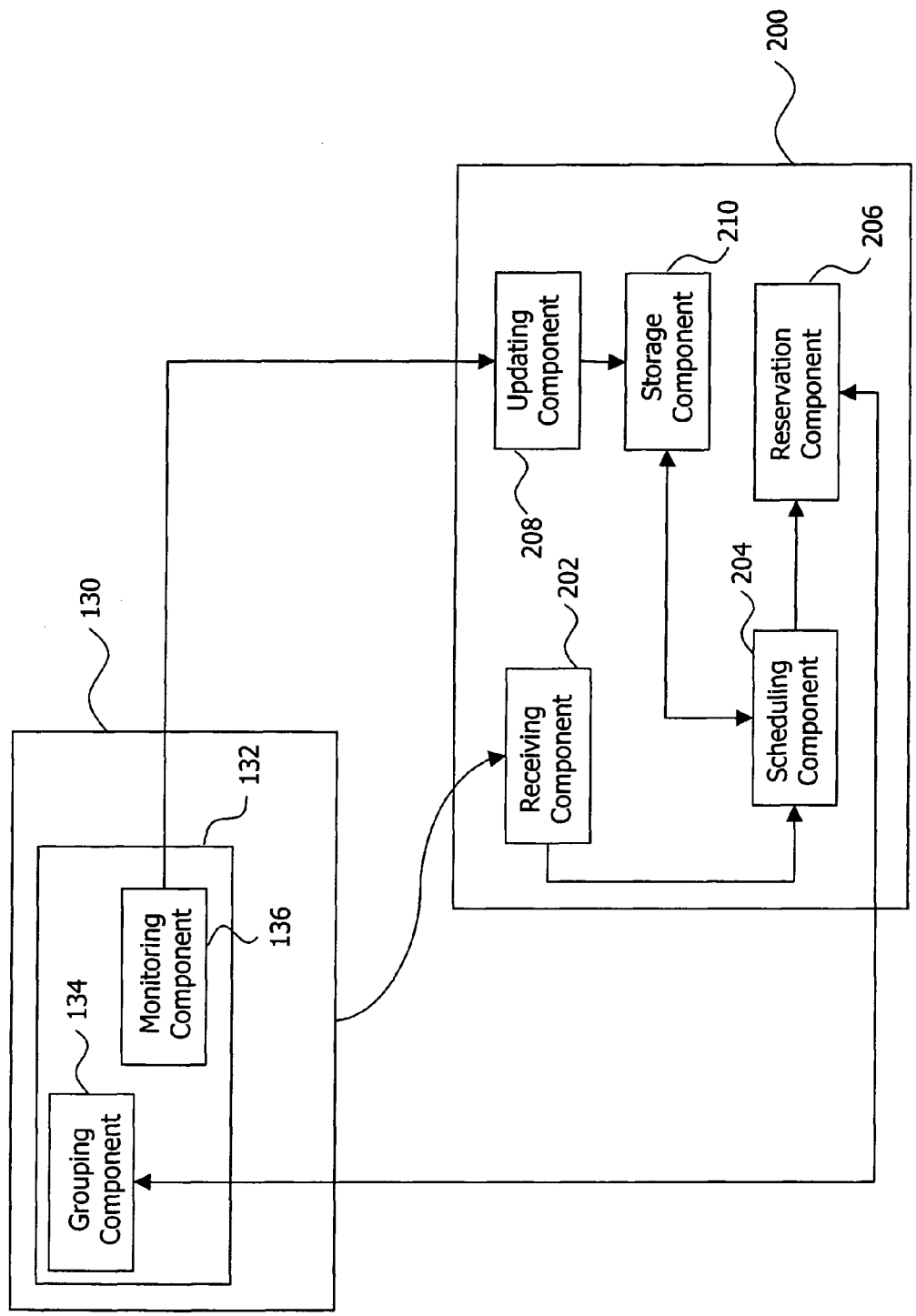
FIG. 2 is a schematic illustration of an apparatus embodiment used in the IMS network architecture of FIG. 1.

FIG. 2 illustrates (still schematically) the AS 130 containing the SGM 132 and the Aggregating Scheduler 200 in more detail.

The SGM 132 contained in the AS 130 comprises a grouping component 134 and a monitoring component 136. The Aggregating Scheduler 200 comprises a receiving component 202, a scheduling component 204, a reservation component 206, an updating component 208 and a storage component 210. The monitoring component 136 is connected to the updating component 208 for providing the updating component 208 with information monitored by the monitoring component 136. The AS 130 is connected to the receiving component 202 for transmitting, to the receiving component 202, resource reservation requests related to MBMS user services provided by the AS 130.

The functionality of the components of the SGM 132 and the Aggregating Scheduler 200 will be described in more detail below with respect to the flowcharts illustrated in FIGS. 3 and 5.

Figure 3:
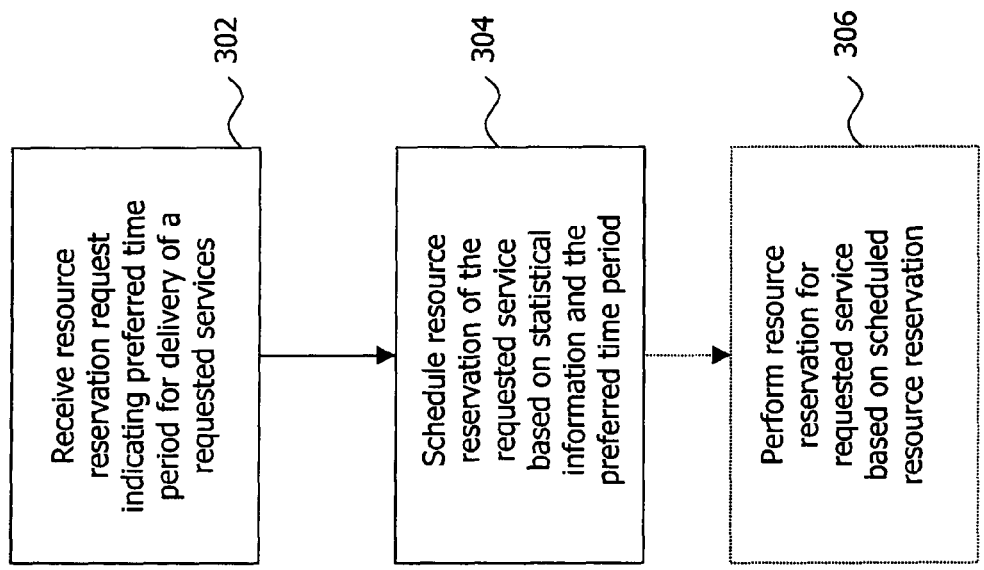
FIG. 3 is a flowchart illustrating a first method embodiment.

FIG. 3 schematically illustrates a first method embodiment performed by the Aggregating Scheduler 200 shown in FIGS. 1 and 2. As shown in FIG. 3, in a first step 302, the receiving component 202 of the Aggregating Scheduler 200 receives a resource reservation request from the AS 130 related to a specific MBMS user service, e.g. a podcast, provided by the AS 130 to which a user has subscribed. The user intends to receive the MBMS user service via his/her terminal device 110, exemplarily illustrated by a notebook in FIG. 1. The resource reservation request signaled by the AS 130 indicates a time period preferred by the user for delivery of the requested MBMS user service. The receiving component 202 forwards information indicating the preferred time period for delivery to the scheduling component 204. The scheduling component 204, in response to the received information indicating the preferred time period, schedules resource reservation of the requested MBMS user service in step 304.

For scheduling the resource reservation of the requested MBMS user service, the scheduling component 204 is adapted to access the storage component 210 in which statistical information related to typical and prior resource utilizations or reservations of the one or more MBMS user services available in the network 100 is stored. The scheduling component 204 retrieves the statistical information needed for scheduling the resource reservation of the requested MBMS user service from the storage component 210. By considering both the preferred time period for delivery of the requested MBMS service indicated in the resource reservation request and the statistical information retrieved from the storage component 210, the scheduling component 204 schedules the resource reservation of the MBMS user service requested by the user.

Further to scheduling the resource reservation, the method may further comprise step 306, as illustrated by the dotted lines in FIG. 3, in which the resource reservation for the requested service is actually performed by the reservation component 206 based on the scheduled resource reservation received by the reservation component 206 from the scheduling component 204.

The statistical information stored in the storage component 210 contains historical data about when how much bandwidth is typically requested by which MBMS user services available in the network 100. The storage component 210 does not only contain historical data about the MBMS user services provided by the AS 130, but of all ASs 130, 140, 150 of the network 100. The scheduling of the resource reservation performed by the scheduling component 204 is a compromise between the preferred time period for delivery proposed by the requested MBMS user service and the time where load of the network is expectably low. The latter can be derived or at least estimated from the statistical information contained in the storage component 210.

The statistical information stored in the storage component 210 is, e.g. periodically, updated by the updating component 208 using information provided by the monitoring component 136 to the updating component 208. The monitoring component 136 is adapted to monitor information related to resource utilizations or reservations of the MBMS user services available in the network 100. The monitoring component 136 is, in the exemplary illustration shown in FIG. 2, arranged in the SGM 132, but may alternatively or additionally be arranged in the Aggregating Scheduler 200 or somewhere else in the AS 130 (not in the SGM 132).

Figure 4:
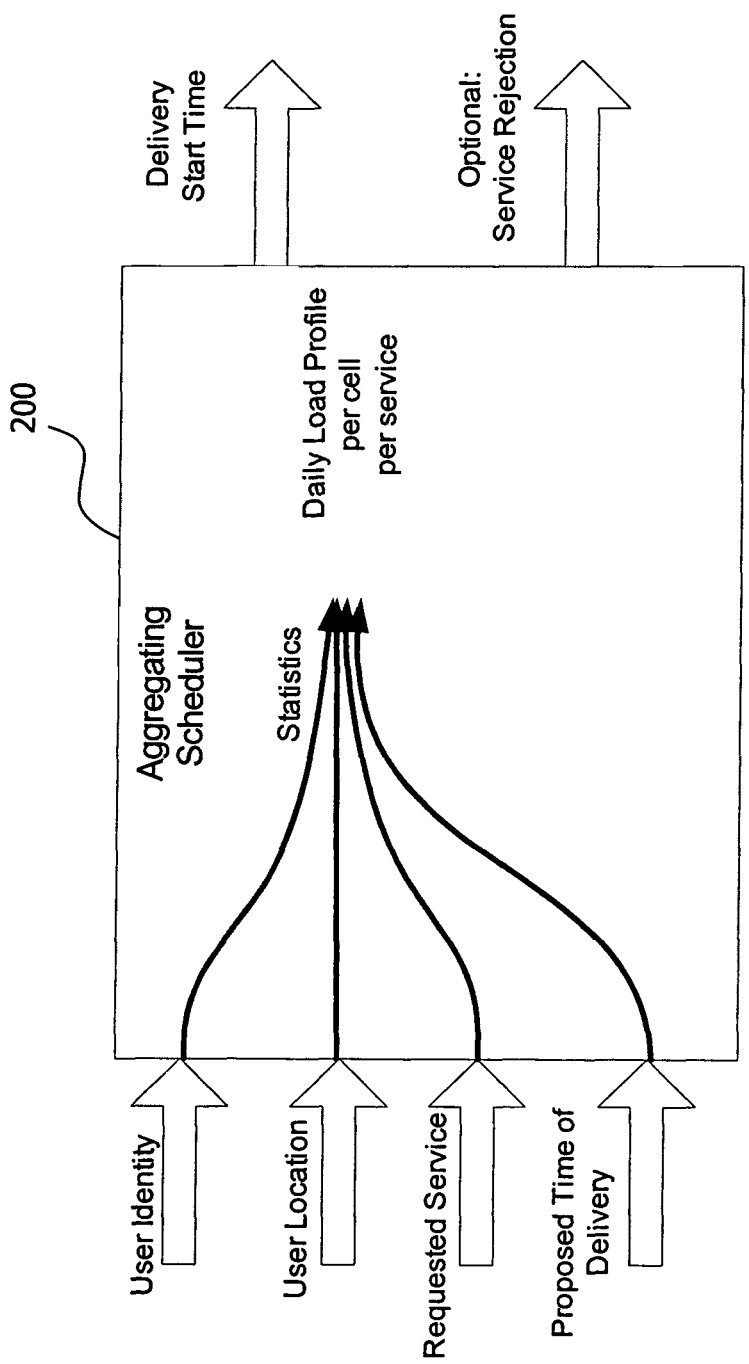
FIG. 4 is a schematic illustration of a component of the apparatus embodiment shown in FIG. 2.

As schematically shown in FIG. 4, the Aggregating Scheduler 200 contains statistical information related to when the MBMS user services provided in the network 100 by the ASs 130, 140, 150 are typically requested or delivered. The monitoring component 136 monitors information related to the requested service(s) and forwards the monitored information to the Aggregating Scheduler 200, for example each time a certain MBMS user service is requested. The information already stored in the Aggregating Scheduler 200 is updated (by the updating component 208) with the information provided by the monitoring component 136. As exemplarily shown in FIG. 4, the monitored information may comprise (but is not limited thereto) the information about the user who requested the MBMS user service (User Identity), the location of the user (User Location), the type of the requested service (Requested Service) and the time of delivery proposed by the user (Proposed Time of Delivery). The statistical information already stored in the Aggregating Scheduler 200 is updated with this information, i.e. all of this information is also stored in the Aggregating Scheduler 200 (in the storage component 210 of the Aggregating Scheduler 200). In this way, a user profile of the user requesting the MBMS user service and of all users requesting the MBMS user services available in the network 100 can be built up.

From the statistical information contained in the Aggregating Scheduler 200, a Daily Load Profile per cell and per service can be derived. That is, it is derivable from the statistical information how much resources a cell typically requires per day and which resource reservation a particular service requires per day. By taking both the information stored in the Aggregating Scheduler 200 and the information input to the Aggregating Scheduler 200 (e.g., the Requested Service and the Proposed Time for Delivery) into account, the Aggregating Scheduler 200 outputs the delivery start time of the requested service. If no adequate delivery start time can be determined by the Aggregating Scheduler 200 because, at the proposed time for delivery, the statistical information related to the MBMS user services stored in the Aggregating Scheduler 200 indicates that too much of the bandwidth available in the network is usually already requested or reserved by other services, i.e. that the load of the network is expectably high, the Aggregating Scheduler 200 outputs a service rejection which indicates that for the requested service no resource reservation can be scheduled.

Further to just scheduling and performing the resource reservations by the Aggregating Scheduler 200 independent of the type of service, the type of service can also be taken into account. For this purpose, the grouping component 134 in the SGM 132 as part of the AS 130 is adapted to analyze the type of requested MBMS user service(s) and to take the number of subscribers requesting the same content into account. The grouping component 134 supervises subscribers, the service and the content they demand. Taking the example of a podcast service, the grouping component 134 has knowledge about which subscriber registered for which podcast.

In the exemplary case of supported multicast/broadcast delivery, the grouping component 134 is adapted to create groups of subscribers that receive the same content, e.g. the same or similar MBMS user service(s). Based on this information, it is decided by the grouping component 134 over which connection each group of users should get its content, i.e. MBMS when the group is big enough or unicast if not. For this purpose, the grouping component 134 determines the size of the group of users requesting a certain MBMS user service and compares the size of the group with a predetermined number, which may be the same or different dependent on the requested MBMS user service. If the size of the group is larger than the predetermined number, the grouping component 134 signals to the reservation component 206 that the service should be transmitted using MBMS. If, however, the size of the group is smaller than the predetermined number, the grouping component 134 signals the reservation component 206 that unicast transmission of the requested service should be performed.

Figure 5:
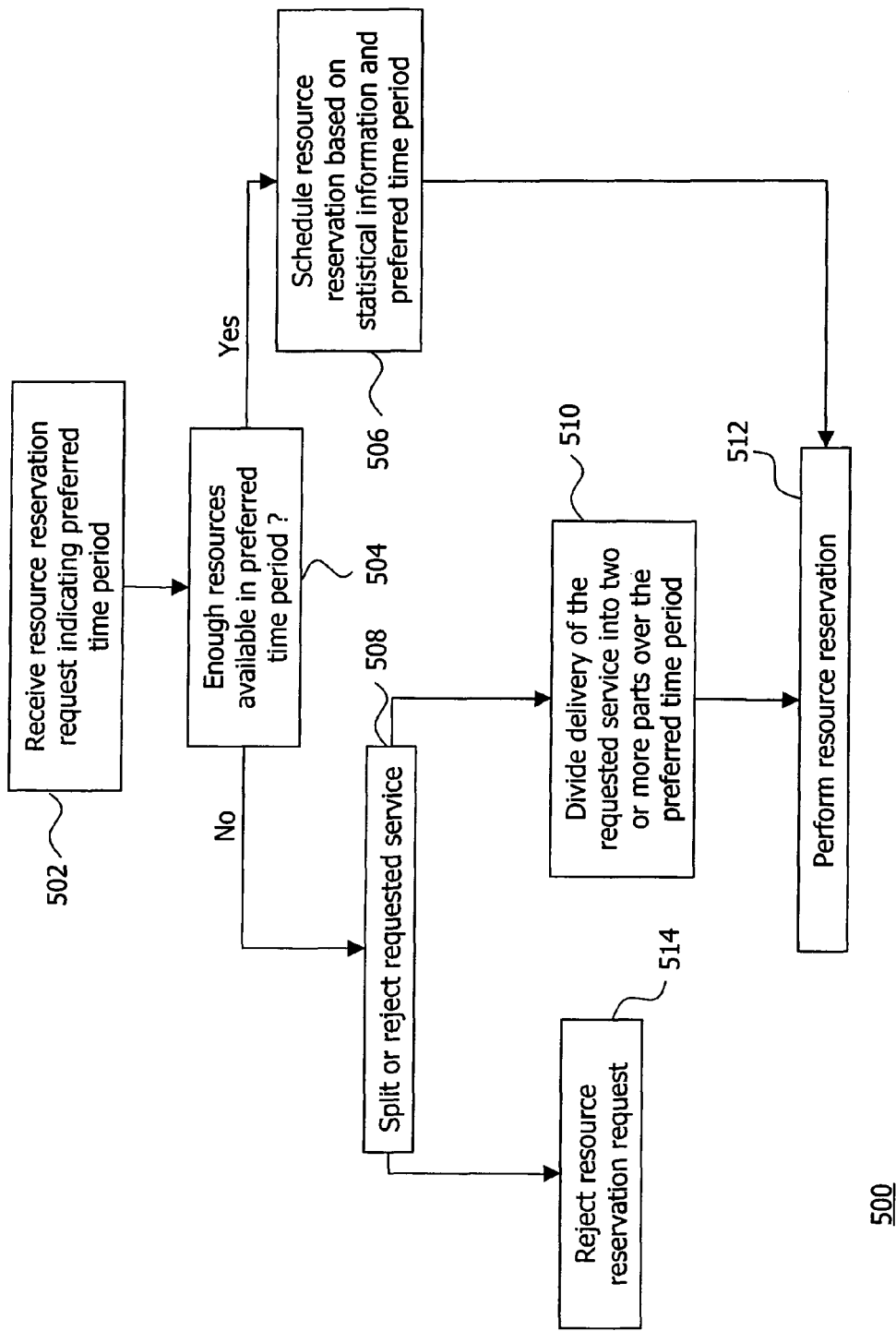
FIG. 5 is a flowchart illustrating a second method embodiment.

FIG. 5 shows a second method embodiment performed by the Aggregating Scheduler 200 shown in FIGS. 1 and 2. In a first step 502, a resource reservation request is received by the receiving component 202 from the AS 130. The resource reservation request indicates a preferred time period for delivery of the requested service. In step 504, it is determined by the scheduling component 204 whether enough resources are available in the preferred time period. For this purpose, the scheduling component 204 accesses the storage component 210 to retrieve the statistical information stored therein as described in detail with respect to FIGS. 3 and 4. The scheduling component 210 then compares the preferred time period with the statistical information to determine whether it can be typically expected that there would be enough resources available in the preferred time period, i.e. whether the statistical information indicates that the services (other than the requested service) usually requested in the preferred time period leave enough available resources.

If it is determined in step 504 that enough resources are (typically) available in the preferred time period, the scheduling component 204 schedules the resource reservation in step 506. In this case, the resource reservation is then performed in step 512 by the reservation component 206.

If, however, it is determined in step 504 that typically not enough resources are available in the preferred time period, it is determined in step 508 by the scheduling component 204 (by also considering the statistical information) whether the requested service allows splitting. If the type of the requested service is capable of splitting or dividing the service, e.g. if the requested service is a download service, and if it can be derived from the statistical information that a splitting of the requested service would enable the requested to be delivered in or close to the preferred time period, the delivery of the requested service is divided into two or more parts over the preferred time period in step 510. The resource reservation is then performed in step 512.

The requested service may principally enable splitting because it is a dividable service, e.g. a download service which can be interrupted and resumed. However, splitting the service would not be performed in step 510 if it is derived from the statistical information in step 508 that there are not enough resources available in the preferred time period even if the service is divided into two or more parts, because one or more parts would have to be delivered significantly later than the end of the preferred time period.

If the service type does not allows splitting or dividing (e.g. in case of a streaming service) of if even a splitting would not enable the service to be delivered, the resource reservation request is rejected in step 514. Instead of determining whether the requested service allows splitting, steps 508 and 510 may be omitted, and the requested service may be rejected in step 514, when it is determined in step 504 that not enough resources are available.

In this way, the Aggregating Scheduler 200 coordinates the requests of several ASs 130, 140, 150 and schedules the resource reservations to suitable times or rejects the requests when no resources or not enough resources are available in the desired time frame. When the content is about to be delivered, it makes the actual resource reservations at the respective policy function in the access network, e.g. the PCRF 180 for 3G networks.

It is believed that many advantages of the current invention will be fully understood from the foregoing description, and it will be apparent that various changes may be made in the form, construction and arrangement of the exemplary aspects thereof without departing from the scope of the invention or without sacrificing all of its advantages. Because the invention can be varied in many ways, it will be recognized that the invention should be limited only by the scope of the following claims.

The invention claimed is:

1. A method for scheduling resource reservations of services in a service providing network having an operator domain and an Internet domain, the method being implemented by an aggregating scheduler and comprising:
   receiving, at the aggregating scheduler in the operator domain and from one of a plurality of application servers in the Internet domain, a resource reservation request indicating a preferred time period for delivery of a requested Multimedia Broadcast Multicast Service (MBMS) user service available in the network, wherein the plurality of application servers provide MBMS user services of different kinds to users, and wherein the application server from which the resource reservation request is received provides the requested MBMS user service; and
   scheduling a resource reservation of the requested MBMS user service based on:
      statistical information related to resource utilizations or related to reservations of one or more services available in the network; and
      the preferred time period for delivery of the requested service,
   wherein the preferred time period indicates a first time period, the statistical information indicates a second time period that does not overlap with the first time period, and the scheduling comprises scheduling the resource reservation of the requested MBMS in a third time period that is different than the first time period and the second time period.

2. The method of claim 1, wherein the one or more services comprise at least the requested service.

3. The method of claim 1, further comprising rejecting the resource reservation request when no or insufficient resources are available for the preferred time period.

4. The method of claim 1, wherein the scheduling comprises dividing delivery of the requested service into two or more parts over the preferred time period when no or insufficient resources are available in at least one or more sub-periods of the preferred time period.

5. The method of claim 1, further comprising monitoring information related to the resource utilizations or the reservations of the one or more services available in the network.

6. The method of claim 5, further comprising determining the statistical information based on the monitored information.

7. The method of claim 1, wherein the statistical information comprises at least one of:
   information about typical times the one or more services available in the network are requested; and
   information about an average frequency that the one or more services available in the network are requested.

8. The method of claim 1,
   wherein the method further comprises, prior to the scheduling, determining one or more possible start times for delivery of the requested service based on the statistical information; and
   wherein the scheduling comprises starting the delivery of the requested service at one of the one or more possible start times depending on the preferred time period.

9. The method of claim 1, further comprising, after the scheduling, performing the resource reservation for the requested service based on the scheduled resource reservation.

10. The method of claim 1, wherein the requested service comprises the transmission of a Podcast, an automotive warning, a news broadcast, audio data, video data, a Short Message Service message, or a Multimedia Message Service message.

11. The method of claim 1, wherein the receiving comprises:
   receiving a multicast resource reservation request indicating the preferred time period for multicast delivery of the requested MBMS service, or receiving a unicast resource reservation request indicating the preferred time period for unicast delivery of the requested MBMS service, depending on the number of subscribers receiving the same content of the MBMS service.

12. The method of claim 1,
   wherein the statistical information comprises statistical information about prior resource utilizations or prior reservations of the one or more services;
   wherein the method further comprises predicting future resource utilizations or reservations of the one or more services based on the statistical information; and
   wherein the scheduling further comprises scheduling based on the prediction.

13. The method of claim 1, wherein the statistical information comprises one or more of the following:
   statistical information about the user identity or user location of the user who requested the one or more services;
   statistical information about the type of service of the one or more services requested; and
   statistical information about the preferred time period of delivery of the one or more services.

14. The method of claim 1, wherein the scheduling comprises coordinating resource reservation requests received from multiple ones of the plurality of application servers, wherein the request received from each application server indicates a preferred time period for delivery of an MBMS user service provided by that application server, and wherein the coordinating is performed based on the statistical information and the preferred time period for delivery of each MBMS user service.

15. The method of claim 1, wherein the service providing network comprises an IP Multimedia Subsystem (IMS) network, wherein the operator domain comprises an IMS layer of the IMS network, and further comprising after the scheduling, performing the resource reservation for the requested service based on the scheduled resource reservation, by signaling the resource reservation to a node implementing a Policy and Charging Rules Function (PCRF) in the operator domain.

16. The method of claim 15, further comprising emulating an interface to the PCRF and intercepting the resource reservation request from the one of the plurality of application servers via the emulated interface, and wherein the signaling comprises signaling the resource reservation to the PCRF via an emulated interface to the one of the plurality of application servers.

17. The method of claim 15, wherein the signaling comprises selectively delaying sending the resource reservation request to the PCRF until a time at which the resource reservation is scheduled.

18. The method of claim 1, further comprising after the scheduling, performing the resource reservation for the requested service based on the scheduled resource reservation, by signaling the resource reservation to a node in the operator domain, wherein the signaling comprises selectively delaying sending the resource reservation request to the node until a time at which the resource reservation is scheduled.

19. A computer program product stored in a non-transitory computer-readable medium, the computer program product comprising program instructions for scheduling resource reservations of services in a service providing network having an operator domain and an Internet domain, the computer program product comprising computer program code which, when run on an computer, configures the computer to:
 receive, in the operator domain and from one of a plurality of application servers in the Internet domain, a resource reservation request indicating a preferred time period for delivery of a requested Multimedia Broadcast Multicast Service (MBMS) user service available in the network, wherein the plurality of application servers provide MBMS user services of different kinds to users, and wherein the application server from which the resource reservation request is received provides the requested MBMS user service; and
 schedule a resource reservation of the requested MBMS user service based on:
  statistical information related to resource utilizations or related to reservations of one or more services available in the network; and
  the preferred time period for delivery of the requested service,
 wherein the preferred time period indicates a first time period, the statistical information indicates a second time period that does not overlap with the first time period, and the resource reservation of the requested MBMS is scheduled in a third time period that is different than the first time period and the second time period.

20. An aggregating scheduler in an operator domain for scheduling resource reservations of services in a service providing network, the aggregating scheduler comprising:
 a receiving circuit configured to receive, from one of a plurality of application servers in an Internet domain, a resource reservation request indicating a preferred time period for delivery of a requested Multimedia Broadcast Multicast Service (MBMS) user service available in the network, wherein the plurality of application servers provide MBMS user services of different kinds to users, and wherein the application server from which the resource reservation request is received provides the requested MBMS user service; and
 a scheduling circuit configured to schedule a resource reservation of the requested MBMS user service based on:
  statistical information related to resource utilizations or related to reservations of one or more services available in the network; and
  the preferred time period for delivery of the requested service,
 wherein the preferred time period indicates a first time period, the statistical information indicates a second time period that does not overlap with the first time period, and the scheduling circuit is configured to schedule the resource reservation by scheduling the resource reservation of the requested MBMS in a third time period that is different than the first time period and the second time period.

21. The scheduler of claim 20, wherein the scheduling circuit is further configured to reject the resource reservation request when no or insufficient resources are available for the preferred time period.

22. The scheduler of claim 20, further comprising a storage circuit configured to store the statistical information related to the resource utilizations or related to the reservations of the one or more services available in the network.

23. The scheduler of claim 20, further comprising:
 a monitoring circuit configured to monitor information related to the resource utilizations or the reservations of the one or more services available in the network; and
 an updating circuit configured to update the statistical information stored in the storage component based on the monitored information related to the resource utilizations or related to the reservations of the one or more services available in the network.

24. The scheduler of claim 20, further comprising a reservation circuit configured to perform the resource reservation for the requested service based on the scheduled resource reservation.

* * * * *